United States Patent

[11] 3,561,516

[72] Inventor Robert R. Reddy
1195 Michillinda, Pasadena, Calif. 91107
[21] Appl. No. 834,231
[22] Filed June 11, 1969
[45] Patented Feb. 9, 1971
Continuation of application Ser. No.
619,233, Feb. 28, 1967, now abandoned.

[54] SAFETY BOLT
9 Claims, 26 Drawing Figs.
[52] U.S. Cl. .................................................... 151/9,
24/211; 151/69
[51] Int. Cl. .................................................... F16b 39/32,
F16b 43/00
[50] Field of Search ........................................ 151/9,
5, 6, 11, 12, 69, 24; 85/8.3, 7, 5(E), 5B, 5M,
81, 80, 8.1, 3; 24/211

[56] References Cited
UNITED STATES PATENTS
960,999   6/1910   Nicholson ................... 151/5
1,597,667 8/1926   Blair ........................... 151/9
3,280,329 9/1965   Copeland ..................... 151/5
3,390,712 7/1968   McKay ........................ 151/24

Primary Examiner—Ramon S. Britts
Attorney—Angus & Mon

ABSTRACT: A safety bolt having a headed end, a shank, and a threaded end, with means near the threaded end to hold the bolt in a hole even though the nut may have fallen off the thread or not have been put on it in the first place. An axial passage in the threaded end intersects a laterally extending passage spaced therefrom, and a dog fills the laterally extending passage and is laterally reciprocable so as to be entirely retracted or extended beyond the maximum diameter of the shank. The dog is biased to its extended position, and carries a retraction surface to retract it as the bolt is thrust into a hole and a restraint surface to retain the bolt after the dog has passed through the hole in a workpiece. Ratchet means may be formed on the dog and on a nut threadable to the bolt so as to retain the nut on the bolt.

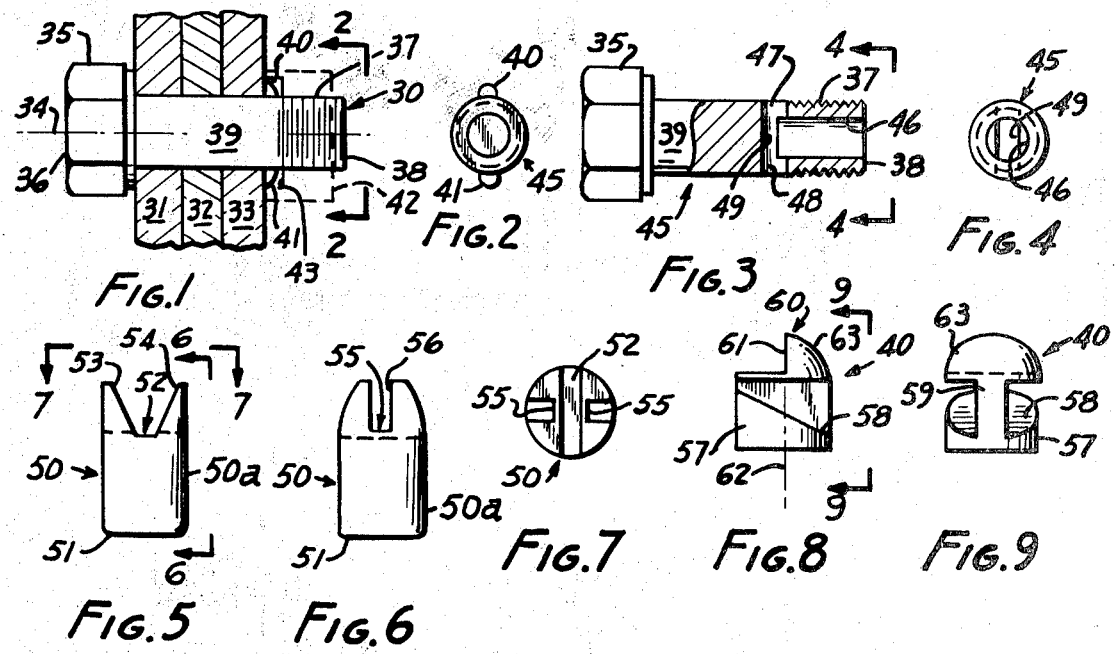
Fig.1  Fig.2  Fig.3  Fig.4
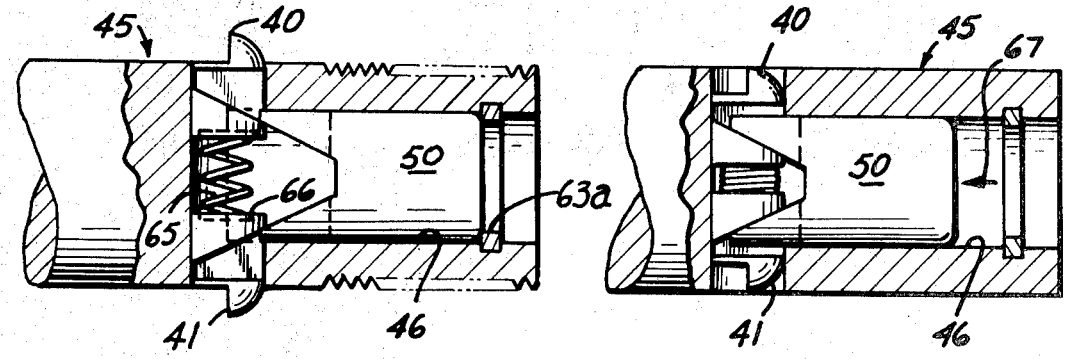
Fig.5  Fig.6  Fig.7  Fig.8  Fig.9
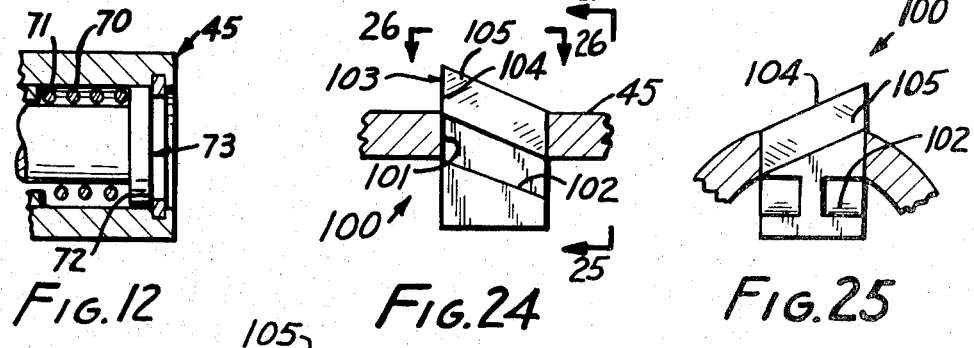
Fig.10  Fig.11
Fig.12  Fig.24  Fig.25
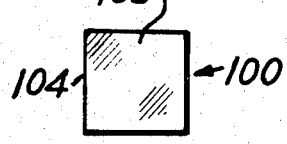
Fig.26
INVENTOR
ROBERT R. REDDY
BY
ATTORNEYS.

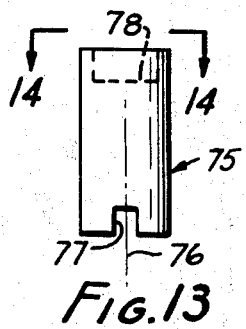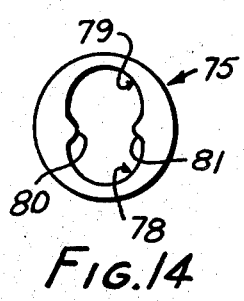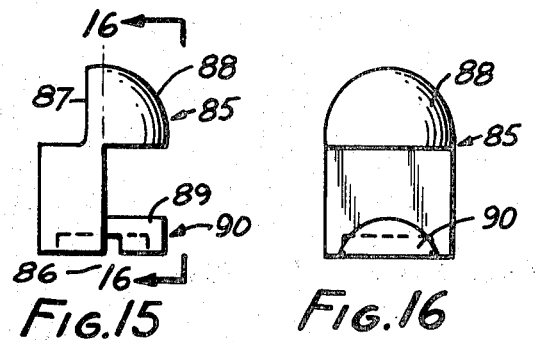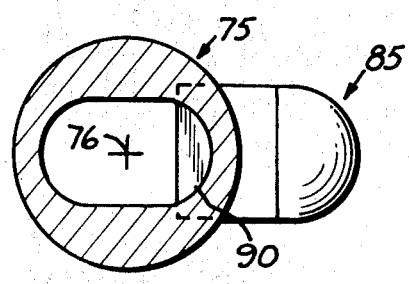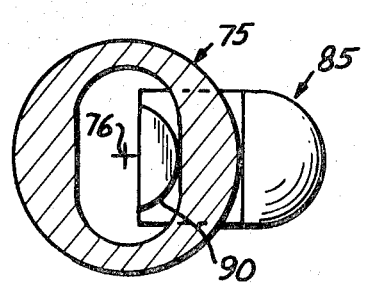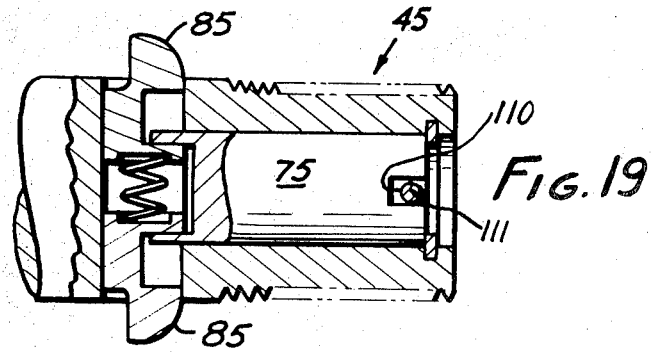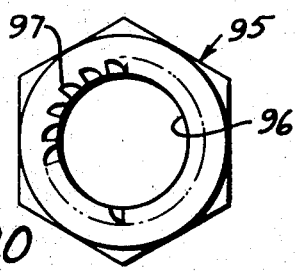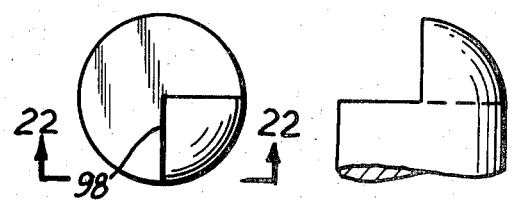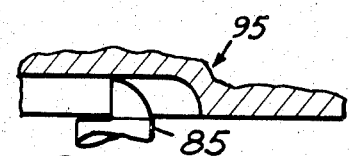

SAFETY BOLT

CROSS-REFERENCE TO RELATED APPLICATIONS

This application is a continuation of applicant's copending U.S. Pat. pending application Ser. No. 619,233, filed Feb. 28, 1967, now abandoned.

This invention relates to safety bolts. Especially in aircraft and other heavy-type installations, the principal utility of a bolt is to withstand shear loads exerted laterally relative to its axis. In practice, a nut is supposed to be threaded onto the bolt in order to hold it in place, and to tighten the joint so as to be resistant to fatigue forces and to axial loads. However, the axial loads are ordinarily of a considerably lesser magnitude than the shear loads and are not the primary intended function of the bolt.

When a nut shakes loose, or the mechanic neglects to put on the nut at all, a situation of very great danger arises, because the bolt could simply fall out of its hole, leaving disabled some critical element of the installation such as a landing gear or some other pivotally mounted device. To overcome this risk, there have been devised a class of bolt known as the "safety bolt" which includes within itself inherent means for axial retention which, while not as strong as a nut threaded onto the bolt, still will hold the bolt in its hole under many, if not most, critical situations, and enable the bolt to perform its primary intended function. If the nut is forgotten or shaken off, the bolt will remain in place under many or most important conditions.

An obvious requirement of such a safety bolt is that it require no care or attention from the mechanic, because it is his failure or inattention which causes the safety bolt to be needed in the first place. Instead, its action must be automatic, and the bolt itself should not be removable except by the conscious and deliberate manipulation of a mechanic.

It is an object of this invention to provide an improved safety bolt with reliable bolt retention features which are at once strong and reliable, and which require conscious acts of manipulation before the bolt can be removed, and which may, if desired, be automatically retractable when the bolt is installed. There is provided a completely reliable safety bolt which overcomes the most dangerous, if not all, of the risks inherent in a mechanic's carelessness.

An optional objective of this invention is to provide a ratcheting means which will retain a nut and prevent it from loosening.

A safety bolt according to this invention includes a shank with a first headed end and a second threaded end. An axial passage is formed in the shank from the second end, and extends through and just beyond the threaded section at which point there is at least one intersecting lateral passage in which a laterally reciprocable dog is disposed. This dog has a restraint surface which is adapted to be retracted within the cylindrical surface of the bolt by motion of a cam member that must be manipulated by the mechanic in order to retract the dog. It may be extended beyond the cylindrical surface by springing or other bias means.

According to a preferred but optional feature of the invention, the cam member and the locking dog include mutually interacting cam surfaces which by axial movement of the cam in one embodiment, or rotary movement of the cam in another embodiment, causes retraction of the locking dog.

According to a preferred embodiment of the invention, a plurality of these dogs is provided which are opposed to each other, and interposed between them is a spring for bias purposes.

According to still another preferred but optional feature of this invention, the locking dog may be provided with ratchet faces, and a nut to be threaded onto the threads of the bolts also is provided with ratchet faces. The nut is retained in a tightened position by virtue of the interaction between the sets of ratchet faces.

The above and other features of this invention will be fully understood from the following detailed description and the accompanying drawings in which:

FIG. 1 is a side elevation partially in cross section showing the presently preferred embodiment of the invention;

FIG. 2 is a partial right-hand view taken at line 2-2 of FIG. 1;

FIG. 3 is a side elevation partly in axial cross section showing a portion of the device of FIG. 1;

FIG. 4 is a right-hand end view taken at line 4-4 of FIG. 3;

FIG. 5 is a side elevation of another portion of the device of FIG. 1;

FIGS. 6 and 7 are a right-hand side view and a top view, respectively, taken at lines 6-6 and 7-7 of FIG. 1;

FIG. 8 is a side elevation of another portion of FIG. 1;

FIG. 9 is a right-hand side view taken at line 9-9 of FIG. 8;

FIG. 10 is a fragmentary axial view partly in cutaway cross section showing a portion of the device of FIG. 1 in the operating condition of FIG. 1;

FIG. 11 is a view similar to FIG. 10 showing the device in another operating configuration;

FIG. 12 is a fragmentary axial cross section of a modification of the device of FIG. 1;

FIG. 13 is a side elevation of an alternate embodiment of the portion of the invention shown in FIGS. 5—7;

FIG. 14 is a top view taken at line 14-14 of FIG. 13;

FIG. 15 is a side elevation of an alternate embodiment of that portion of FIG. 1 shown in FIGS. 8 and 9;

FIG. 16 is a side view taken at line 16-16 of FIG. 15;

FIG. 17 and 18 are fragmentary top views showing the interaction between the elements of FIGS. 13—16 in two operating positions;

FIG. 19 shows the devices of FIGS. 13—16 in use in the bolt of FIG. 1;

FIG. 20 is an end view of a nut suitable for use with any embodiment of the invention;

FIG. 21 is an end view of a modified locking dog for use with the nut of FIG. 20;

FIG. 22 is a bottom view taken at line 22-22 of FIG. 21;

FIG. 23 is a fragmentary view partly in cutaway cross section showing the interrelationship of the devices of FIGS. 20 and 21;

FIG. 24 is a side elevation of yet another alternate embodiment of that portion of FIG. 1 shown in FIGS. 8 and 9; and FIGS. 25 and 26 are fragmentary side and top views taken at lines 25-25 and 26-26, respectively, of FIG. 24.

FIG. 1 illustrates the presently preferred embodiment of the safety bolt assembly 30 according to the invention. It is shown clamping three plates 31, 32, 33 together. However, the bolt is primarily intended to withstand shear forces which are exerted laterally relative to axis 34 of the safety bolt. The safety bolt includes a head 35 at a first end 36, a threaded section 37 adjacent to a second end 38, and a cylindrical shank 39 having a cylindrical outer wall extending between the head and the thread.

A pair of locking dogs 40, 41 are shown projecting beyond the wall of the cylindrical shank. They bear against plate 33 while the head bears against plate 31. It is the function of these locking dogs to hold the safety bolt in place against some axial loads.

A nut 42 with a countersink 43 is adapted to be threaded onto the threaded section to perform the major function of axial restraint. This nut is shown in dashed line to indicate that it is one purpose of this invention to make the bolt safe against the mechanic's forgetfulness in applying the nut or of applying it so loosely that it may fall off due to vibratory forces and the like. The application with a nut is shown in FIGS. 20—23. In the application of FIG. 1, which does not illustrate a ratcheting feature, the counterbore clears the dogs.

As best shown in FIG. 3, the bolt portion 45 includes an axial passage 46 which opens onto first end 38. A pair of lateral passages 47, 48 intersect the axial passage and open onto the wall of the cylindrical shank, spaced from the threaded section. There may be only one of these lateral passages, or there may be two or more. Ordinarily, it is preferred to have two of the lateral passages opposed and aligned, so that two locking dogs may be used with a simple bias means interposed between them. A guide base 49 is formed at the bottom of the axial passage to form a continuation of the lateral passages so as to give bottom support to the locking dogs as they reciprocate in their respective passages.

A cam member 50 (FIGS. 5—7) comprising a cylindrical sidewall 50a adapted to fit slideably in the axial passage includes a flat end 51, and an end modified for camming purposes on the other extreme. This other end is readily formed by milling in one direction (FIG. 5) a V-shaped slot 52 to form a pair of cam surfaces 53, 54. At 90° thereto (FIG. 6), there is milled a flat slot 55 which is adapted to straddle a portion of a locking dog, and whose wall 56 constitutes a guide means.

A locking dog is provided in each lateral passage. The locking dogs are identical, and only dog 40 is shown in FIGS. 8 and 9. The dogs have a generally cylindrical sidewall 57 and, as shown in FIG. 7, also include a sloped cam surface 58 with substantially the same pitch as cam surfaces 53 and 54. A bar portion 59 is adapted to fit in slot 55 with walls 56 abutting it. A projection 60 includes a restraint surface 61 which is flat and parallel to the axis 62 of the locking dog, and also a retraction surface 63 which is sloped relative to the axis, facilitating the retraction of the dogs into the bolt portion when it is being passed through the hole in the plates. A snap ring 63a retains the cam member in the axial passage, and limits its retraction so that the cam member holds the dogs in their respective lateral passages.

It will now be seen that, with the locking dogs in their respective lateral passages, they may be pulled inwardly by force of the cam surfaces 53, 54 exerted against cam surfaces 58. Motion in the other direction (which includes expulsion movement, to the right in FIG. 1, of the cam member) is performed by bias means 65 shown in FIG. 10 as a coil or leaf spring interposed between the two locking dogs and seated in sinks 66 in the base of the locking dogs.

The assembled configuration is shown in FIGS. 10 and 11 in two operative conditions. In FIG. 10, the cam member 50 is moved to the right, and the locking dogs have been moved outwardly by action of the bias means. In FIG. 11, the cam member has been pressed to the left as indicated by arrow 67 and this has caused the cam surfaces to interact and to retract the locking dogs within the cylindrical wall of the shank.

FIG. 12 illustrates an optional feature comprising a spring 70 in compression between a shoulder 71 fixed to member 45 inside its axial passage and a flange 72 on a cam member 73. The coil spring 65, by pressing the dogs against the cam member, tends to bias the cam member to the right, thereby assuring that the bias means will be able to extend the locking dogs without interference from the cam member in all embodiments. Spring 70 adds to this effect by biasing the cam member itself away from the dogs. In all embodiments, the cam member always overhangs a portion of each of the dogs, to keep the dogs from falling out.

The device heretofore described utilizes axial movement of the cam member to retract the locking dogs. It should be understood that this is only one type of motion which would be effective for the purpose. In FIGS. 13—19, the use of a rotary camming motion is shown. The same bolt portion 45 will be used as in FIG. 1, only the cam member and locking dogs being modified. In FIGS. 13 and 14, there is shown a cam member 75 having an axis 76 about which the cam member is intended to be rotated. In one end, it has a cross slot 77 which is engageable by a screw driver or other torque-type tool for turning the same.

In its other end, it includes a cam recess 78 which includes a cam surface 79, which cam surface includes a pair of stops 80, 81. The cam surface projects for a different distance from the central axis as a function of angular position in accordance with usual cam techniques.

In FIGS. 15 and 16, there is shown an example of a locking dog 85 suitable for use with cam member 75. This cam member has an axis 86 along which it is intended to be reciprocable in its respective lateral passage. It includes a restraint surface 87 and a retraction surface 88 as in FIGS. 8 and 9. It differs from the device of FIGS. 8 and 9 in that its cam surface 89 is formed on a lug portion 90 adapted to overhang the camming end of the cam member and engage the cam surface thereof.

FIGS. 17 and 18 show two relative positions of cam member 75 and locking dog 85. In FIG. 16, the cam member is turned so that the locking dog has moved by its greatest axial excursion to the right. This is the locking condition. In FIG. 18, the cam member has been turned so as to retract the locking dog by moving it to the left. This is the unlocked condition.

FIG. 19 shows the total device in great detail.

When the nut is turned onto the threads of the safety bolt, there is still the risk that it may shake loose. For this purpose, it is common practice to provide cotter pins, safety wires, and the like. This invention is further adapted to provide additional safety means, which can do without conventional safety means, and be automatic in its action.

One embodiment is shown in FIGS. 20—23, wherein a nut 95 of standard configuration including a central threaded passage 96 is modified by the inclusion of ratchet faces 97. Either of the embodiments of the locking dogs may be modified as shown in FIGS. 21 and 22 to include a ratchet face 98. Because of the spring bias against the locking dogs, they can be pressed back into the lateral passages as the ratchet faces move past the dogs or the nut is being tightened down. They will then snap into the recesses 97a and the ratchet faces will abut to prevent loosening of the nut when tightening is complete. The joint is then locked until the dogs are retracted by actuation of the cam member.

Still another ratcheting, nut retaining dog is shown in FIGS. 24—26. This dog has a square cross section, which indicates that the lateral passage need not be round, but may be of any shape. In a ratchet device, the noncircular cross section has the advantage of preventing rotation of the dog.

Dog 100 fits into a square lateral passage 101 in a bolt 45 modified in this manner. It includes cam surfaces 102 which are identical to surfaces 58, and are adapted to be acted upon by cam member 50 just as dog 40 is acted upon by that cam member. A restraint surface 103 faces toward the headed end. Face 104 is a ratcheting face to engage a like face in the counterbore of a nut such as nut 95. A canted face 105 is flat, and slopes away from the axis as it extends toward the headed end, and also as it extends toward the ratcheting face. This combination of slopes enables the dog to be pressed into the lateral passage as it passes through a hole in the plate in which it is to be installed, and also when the nut ratchets across the dog. This retraction is made possible by the spring bias.

Additional, and more conventional, safetying features may also be used with any embodiment. For example, in FIG. 19, there is shown a lockwire hole 110 drilled through the wall of the threaded portion, with a lockwire 111 passing through it, and through the slot in the retaining cam. Now the cam cannot be turned to release the bolt without first removing the safety wire. This is merely one example of the many kinds of additional securement which can be provided by preventing the movement of the cam member.

In this invention, a flat retention surface is preferably used, because this avoids brinnelling, which can occur when rounded surfaces, such as balls, are used. Furthermore, this results in placing the load on the dogs in the form of a pure shear load, and does not tend to place the dogs under compressive or other types of loads which have undesirable effects. Retraction surfaces 88 are preferably nonperpendicular to central axis 34, because then there need be no act of retraction prior to insertion of the bolt—the dogs simply retracting by virtue of contact with the wall of the hole on the way in. The device is then inherently reliable, there being no means provided which might be overlooked and keep the dogs retracted.

This invention thereby provides a safety bolt in which a joint is secured against forgetfulness of the mechanic by the simple act of installing the bolt itself. The bolt may readily be removed by actuation of a cam member, but the actuation of this cam member requires positive manipulation which cannot result from accidentally or randomly exerted forces. The device does not interfere with the strength of the bolt where it must carry its major lateral loads nor does the hole through the threaded portion reduce the strength of that portion below its design levels. The safetying device itself need not be overly large, and, in fact, may take up only a minor portion of the cross-sectional area of the bolt wherever it is installed. More or fewer dogs may be provided, depending on the strength of the retention desired. It will be further noted that the dogs are backed up by strong sections of the bolt portion and that this abutment is in itself a very strong and reliable retention means against axial loads, and is completely proof against vibrational loads, because it cannot shake out or off.

This device may include an additional safetying feature such as the ratcheting lock.

This invention is not to be limited by the embodiments shown in the drawings and described in the description which are given by way of example and not of limitation, but only in accordance with the scope of the appended claims.

I claim:

1. A safety bolt comprising: an element having a shank with an axis and an unthreaded portion, the element having a first headed end and a second threaded end, an axial passage opening onto said second end, and a laterally extending passage opening onto the shank and intersecting the axial passage; a dog slideably mounted between extended and retracted positions in said laterally extending passage whereby the dog extends beyond the maximum diameter of the shank in the extended position and retracts entirely within said shank in the retracted position, said dog including a planar restraint surface which lies normal to the said axis and faces the headed end, whereby it is adapted to abut the back side of a body into which the shank is inserted, a retraction surface facing toward the threaded end and sloping inwardly toward it, both of said surfaces being adapted to project beyond the radius of the unthreaded portion of the shank, whereby the restraint surface, when extended, prevents the removal of the bolt by a force exerted in shear, and the retraction surface is adapted to engage the said body in order for the dog to be retracted into the bolt while the shank is being pressed into a hole in the body, the dog fully occupying the laterally extending passage in cross section to create such shear relationship; a cam member movable in said axial passage and reactive with said dog to retract the same; and bias means forcing the dog toward its extended position independently of the position of the cam member.

2. A safety bolt according to claim 1 in which said dog and cam member each has a camming surface mutually reactive to retract the dog.

3. A safety bolt according to claim 2 in which the cam member is axially movable, and in which the camming surfaces are slanted relative to said axis.

4. A safety bolt according to claim 2 in which the cam member is rotatable, and in which at least one of the cam surfaces has a plurality of regions at different radial spacings from the axis.

5. A safety bolt according to claim 2 in which safetying means is provided to secure the cam member against movement.

6. In combination: a safety bolt comprising an element having a shank with an axis and an unthreaded portion, the element having a first headed end and a second threaded end, an axial passage opening onto said second end, a laterally extending passage opening onto the shank and intersecting the axial passage, a dog slideably mounted between extended and retracted positions in said laterally extending passage whereby the dog extends beyond the maximum diameter of the shank in the extended position and retracts entirely within said shank in the retracted position, said dog including a planar restraint surface which lies normal to the said axis and faces the headed end, whereby it is adapted to abut the back side of a body into which the shank is inserted, a retraction surface facing toward the threaded end and sloping inwardly toward it, both of said surfaces being adapted to project beyond the radius of the unthreaded portion of the shank, whereby the restraint surface, when extended, prevents the removal of the bolt by a force exerted in shear and the retraction surface is adapted to engage the said body in order for the dog to be retracted into the bolt while the shank is being pressed into a hole in the body, the dog fully occupying the laterally extending passage in cross section to create such shear relationship, said dog including a ratchet face and a sloping retraction face, and a cam member movable in said axial passage and reactive with said dog to retract the same, bias means forcing the dog toward its extended position, and a nut threadable onto the threaded end having a plurality of ratchet faces in a counterbore, whereby tightening the nut onto the threads causes the dog to ratchet along the ratchet faces of the nut, and the ratchet faces to engage and resist unthreading of the nut from the bolt.

7. A combination according to claim 6 in which said dog and cam member each has a camming surface mutually reactive to retract the dog.

8. A combination according to claim 7 in which the cam member is axially movable, and in which the camming surfaces are slanted relative to said axis.

9. A combination according to claim 7 in which the cam member is rotatable, and in which at least one of the cam surfaces has a plurality of regions at different radial spacings from the axis.

UNITED STATES PATENT OFFICE
CERTIFICATE OF CORRECTION

Patent No. 3,561,516      Dated February 9, 1971

Inventor(s) Robert R. Reddy

It is certified that error appears in the above-identified patent and that said Letters Patent are hereby corrected as shown below:

In the Patent

References Cited

Patent No. "3,280,329" should be --3,208,329--

Signed and sealed this 2nd day of May 1972.

(SEAL)
Attest:

EDWARD M. FLETCHER, JR.
Attesting Officer

ROBERT GOTTSCHALK
Commissioner of Patents